(12) United States Patent
Coates et al.

(10) Patent No.: US 7,811,631 B2
(45) Date of Patent: Oct. 12, 2010

(54) METHOD OF TREATING FLUOROPOLYMER PARTICLES AND THE PRODUCTS THEREOF

(75) Inventors: Michael Coates, Moorestown, NJ (US); Wes Demonde, Newtown Square, PA (US); Kurt Davidson, Collegeville, PA (US)

(73) Assignee: Laurel Products, LLC, Moorestown, NJ (US)

( * ) Notice: Subject to any disclaimer, the term of this patent is extended or adjusted under 35 U.S.C. 154(b) by 940 days.

(21) Appl. No.: 11/463,498

(22) Filed: Aug. 9, 2006

(65) Prior Publication Data

US 2007/0059445 A1    Mar. 15, 2007

Related U.S. Application Data

(63) Continuation of application No. 10/345,541, filed on Jan. 16, 2003, now Pat. No. 7,220,483, which is a continuation-in-part of application No. 10/128,185, filed on Apr. 23, 2002, now Pat. No. 6,824,872.

(51) Int. Cl.
    *B05D 7/00* (2006.01)
(52) U.S. Cl. ........................... 427/212; 427/532
(58) Field of Classification Search .................. 427/212
    See application file for complete search history.

(56) References Cited

U.S. PATENT DOCUMENTS

| | | | |
|---|---|---|---|
| 3,962,373 A * | 6/1976 | Petrucelli | 525/199 |
| 4,159,286 A * | 6/1979 | Khattab et al. | 523/220 |
| 4,287,032 A | 9/1981 | Pellegri | |
| 5,069,926 A | 12/1991 | Iwata et al. | |
| 5,100,689 A | 3/1992 | Goldberg et al. | |

(Continued)

FOREIGN PATENT DOCUMENTS

| | | | |
|---|---|---|---|
| EP | 0214880 | | 3/1987 |
| EP | 1007584 | * | 6/2000 |
| EP | 1007584 | | 10/2003 |
| EP | 0526797 | | 11/2006 |
| WO | WO9907549 | | 2/1999 |

OTHER PUBLICATIONS

Article—"Plasma-inducted immobilization of poly(ethylene glycol) onto poly (vinylidene fluoride) microporous membrane," Wang et al., Journal of Membrane Science 195 (2002) pp. 103-114.
Article—"Surface carboxylation of PEEK film by selective wet-chemistry," Henneuse et al. Polymer vol. 39, No. 4 1998, pp. 835-844.
Article—"Surface animation of PEEK film by selective wet-chemistry," Henneuse-Boxus et all, Polymer vol. 39, No. 22, 1998, pp. 5359-5369.
Article—"Multi-Layer Coating of Ultrathin Polymer Films on Nano-Particles of Alumina by a Plasma Treatment," Donglu Shi et al., Dept of Materials Science and Engineering, University of Cincinnati, pp. 1-6.

(Continued)

*Primary Examiner*—Michael Cleveland
*Assistant Examiner*—Robert Vetere
(74) *Attorney, Agent, or Firm*—Baker & Daniels LLP

(57) ABSTRACT

Fluoropolymer particles are subjected to high energy treatment so as to change the chemical functionality of the particle surfaces and thereby change the surface characteristics of the particles. These characteristics improve the usefulness of these particles and can make them highly dispersible, even in water. The surface treated fluoropolymer particles are subject to a chemical crosslinking process, or alternatively, are subject to a high energy treatment process, and may optionally be pretreated with a macromolecular chemical species prior to the foregoing processes. The high energy treatment can be used to both surface treat the fluoropolymer particles and in some embodiments, may also cause chain scission of the fluoropolymers to thereby reduce the molecular weight of the fluoropolymer particles. The surface treated fluoropolymer particles can be used to form fluoropolymer coatings on various substrates.

20 Claims, 1 Drawing Sheet

U.S. PATENT DOCUMENTS

| | | |
|---|---|---|
| 5,176,938 A | 1/1993 | Wallsten et al. |
| 5,283,086 A | 2/1994 | Kodama et al. |
| 5,322,737 A | 6/1994 | Morra et al. |
| 5,386,055 A * | 1/1995 | Lee et al. .............. 562/512.2 |
| 5,424,160 A | 6/1995 | Smith et al. |
| 5,576,106 A | 11/1996 | Kerbow et al. |
| 5,756,199 A | 5/1998 | Kerbow et al. |
| 5,859,086 A | 1/1999 | Freund et al. |
| 5,916,929 A * | 6/1999 | Knobel et al. .............. 522/155 |
| 6,074,534 A | 6/2000 | Goudmand et al. |
| 6,515,066 B2 | 2/2003 | Allen et al. |
| 6,824,872 B2 | 11/2004 | Coates et al. |
| 2002/0161067 A1 | 10/2002 | Udagawa et al. |
| 2003/0199639 A1 | 10/2003 | Coates et al. |

OTHER PUBLICATIONS

Article—"Antifouling Poly(vinylidene fluoride) Microporous Membranes Prepared Via Plasma-Induced Surface Grafting of Poly(ethylene glycol)," Peng Wang et al., Adhesion Science Technology, vol. 16, pp. 111-127, 2002.

Article—"Atmospheric Plasma—The New Functional Treatment for Films," A. Yializis et al., 2000 TAPPI Polymers, Laminations & Coating Conference, pp. 1343-1352.

Internet Search Results (Google) Sep. 7, 2001—Atmospheric Plasma Treatment, 2 pp.

Webpage—Sigma Technologies Int'l Inc.; Surface Treatment Systems, 1 pg.

Webpage—Enercon Industries Corporation; Revolutionary Breakthrough in Surface Treating—Atmospheric Plasma Treating, 1 pg.

* cited by examiner

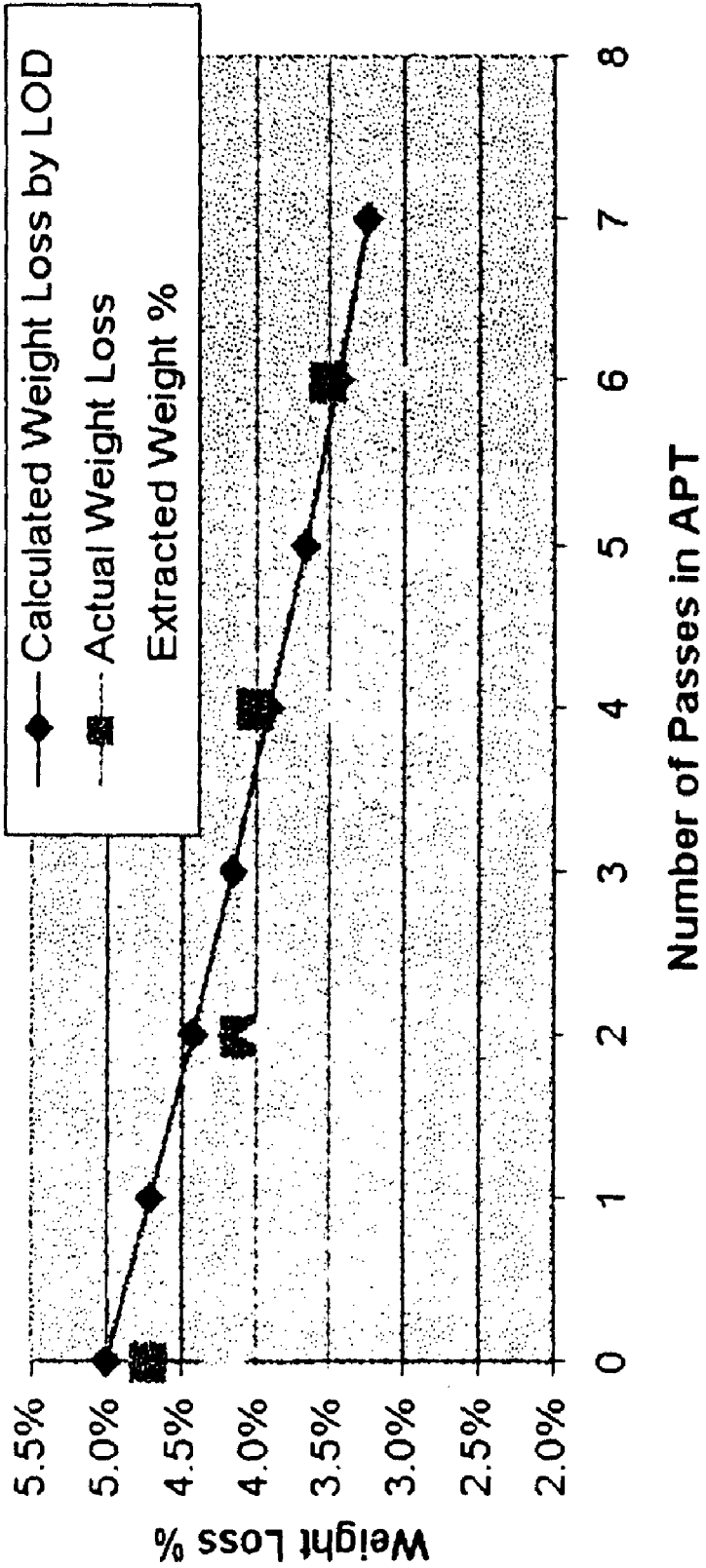

METHOD OF TREATING FLUOROPOLYMER PARTICLES AND THE PRODUCTS THEREOF

CROSS-REFERENCE TO RELATED APPLICATIONS

The present application is a continuation of U.S. patent application Ser. No. 10/345,541, now U.S. Pat. No. 7,220,483 filed Jan. 16, 2003, which is a continuation-in-part of U.S. patent application Ser. No. 10/128,185, now U.S. Pat. No. 6,824,872 filed Apr. 23, 2002.

TECHNICAL FIELD

The present invention relates to fluoropolymers. More particularly, the present invention is directed at producing a novel fluoropolymer by using a high energy source to immobilize macromolecules on the surface of fluoropolymer particles and/or to modify the molecular weight of the fluoropolymer particles.

BACKGROUND ART

Fluoropolymers, are defined herein broadly as any of the fluorine containing polymers (or inert polymers), including homopolymers, copolymers, and terpolymers that have non-wettable and chemical inert surfaces which, although being desired in some applications, limit the use of these materials in other applications.

The technology of coating of articles with fluoropolymers has been developing along two fundamentally distinctive directions based on the physical form of powder and latex fluoropolymers. In each case, the final coating, which may be a continuous film layer, for example, is typically obtained by heating the applied fluoropolymers above their melting points.

Processes and products have been developed which provide specific advantages for powder and latex fluoropolymer applications. For technologies that use powdered fluoropolymers, modified polymer compositions and particle sizes and shapes have been developed to advance both the application yield (yield per pass) and the performance of the resulting film per unit film thickness. The major intrinsic obstacle to advancements in the use of powdered fluoropolymers is their poor electrical surface conductivity.

For latexes, the ultra low surface energy and the high specific gravity peculiar to fluoropolymers (they can be defined as being fully hydrophobic) has forced the adoption of different manufacturing technologies since the base polymer synthesis (e.g. dispersion) is characterized by polymer particles having an average diameter two orders of magnitude smaller than the powders, and by the extensive use of surfactants, both the fluorinated surfactants used during synthesis, and hydrogenated surfactants for the creaming of diluted dispersion obtained from the synthesis, and for the stabilization and formulation of concentrated latexes manageable by the application techniques (e.g. spray, roll, curtain coating). However, both kinds of surfactants, intrinsic to the technology, are detrimental to the coating application, negatively impacting the yield and the characteristics of the film layer (e.g. film continuity, adhesion to the substrate, etc.).

A way to escape from these two fundamental approaches is theoretically conceivable, and involves the modification of the fluoropolymer particle surface, to make it more compatible with the broad spectrum of available polar carrier means (e.g. water), but without altering/damaging the properties of the fluoropolymer bulk.

Surface treatments of fluoropolymer are known and established in the art. Fluoropolymers in the form of sheets, films and shaped articles have been chemically treated, subject to electrical discharged using corona discharge and plasmas, subject to flame treatment, and subject to physical treatment such as chemical adsorbing procedures. In each instance, desired results have often been less than satisfactory. For example, surface changes effected by chemical treatments produces darkening of the surface and chemical absorbing procedures are subject to deterioration and loss over time.

Flame treatments can cause undesired damage if not properly controlled.

Electrical treatments seem to have become the most accepted processes for desired long term effects. However, as discussed below, these treatment processes have limitations.

Corona discharge and flame treatment processes are used for treating the surfaces of polymer films and other substrates such as foils, papers, etc. These treatment processes increase the surface energy of the substrates, which in turn improves the wettability, printability and adhesion on these surfaces. Corona discharges can produce locally concentrated discharges known as streamers. These streamers lead to some non-uniformity in the treatment of the film surfaces, and the concentrated energy of the streamers can also microscopically damage the film surface. Furthermore, corona treatment can produce backside treatment, which is undesirable in many applications.

Flame treatment also has limitations in terms of oxidation surface modification, difficulty in control and possibility of excessive thermal loads.

Plasma treatment is an effective method for treating surfaces to increase surface energy and improve wettability, printability and adhesion. Plasma produces uniform surface treatment without causing backside treatment of the substrate.

Low-pressure or atmospheric plasma treatment (APT) processes have been developed that provide unique advantages over existing technologies for surface treatment. The apparatus used in atmospheric plasma treatment does not require a vacuum system, produces a high-density plasma and provides treatment of various substrates at low temperature while operating at atmospheric pressure. The benefits of plasma treatment include reduced degradation of surface morphology, higher treatment (dyne) levels, elimination of backside treatment, and extended life over treatment time.

As reported by A. Yializis et al. (Atmospheric Plasma—The New Functional Treatment for Film, 2000 TAPPI Polymers, Laminations, & Coatings Conference pp. 1343-1352), atmospheric plasma treatment processes have been developed for treating continuous webs and films.

DISCLOSURE OF THE INVENTION

The present invention provides a method of treating fluoropolymer particles which includes, in one aspect, attaching macromolecules to fluoropolymer particles using a high energy source, such as atmospheric plasma, x-ray radiation, electron radiation, ion beam irradiation, ultraviolet radiation, or other suitable methods to change the functional characteristics of the fluoropolymer particles. Herein "radiation" and "irradiation" each generally refer to treatment by exposure to radiation.

U.S. patent application Ser. No. 10/128,185, now U.S. Pat. No. 6,824,872 the parent application of the present patent application, describes methods for treating fluoropolymers, in which a dry fluoropolymer powder is blended with a macromolecule in a solvent, followed by drying to evaporate the solvent, and then applying high energy in the form of atmospheric plasma treatment, for example, which attaches the macromolecules to the individual fluoropolymer particles in the powder. In this manner, a fluoropolymer with immobilized macromolecules thereon is produced, which is hydrophilic, wettable, and demonstrates other desirable functional properties.

In the method further described herein, it has been found that fluoropolymers can be treated in a "wet system", in which high energy, such as electron beam treatment, for example, is applied to the fluoropolymers while same are dispersed in a liquid medium.

In one aspect of the present invention, a macromolecule is added to a liquid dispersion of fluoropolymer particles, which mixture is then subjected to high energy treatment, such as electron beam treatment, for example, which attaches the macromolecules to the fluoropolymer particles, thereby forming a dispersion of fluoropolymer particles having immobilized macromolecules thereon. In this manner, a dispersion of fluoropolymer particles with immobilized macromolecules thereon is produced, which is hydrophilic, wettable, and demonstrates other desirable functional properties. Optionally, the dispersion may be dried to form a dried, treated, fluoropolymer powder.

Further, the high energy treatment of a liquid dispersion of fluoropolymer particles and macromolecules not only immobilizes the macromolecules on the fluoropolymer particles, but may also induce chain scission or crosslinking within the fluoropolymer, thereby reducing or increasing the molecular weight of the fluoropolymer, respectively. The dispersion may optionally be dried to produce a surface treated, fluoropolymer micropowder.

A cross-linking agent may also be used in the present method to form cross links within and/or between the macromolecules. For example, the cross-linking agent may be added to the dispersion prior to high energy treatment, whereupon during application of high energy to the dispersion, the cross-linking agent forms cross links within and/or between the macromolecules and covalent bonds between the macromolecules and the fluoropolymer to enhance the immobilization of the macromolecules on the fluoropolymer particles. Alternatively, the crosslinking can be carried out via thermal heating, which immobilizes the macromolecules on the fluoropolymer particles without covalent bonding between the macromolecule and the fluoropolymer.

Notably, it has been found that when a dispersion of fluoropolymer particles, optionally including surfactants therein but not including macromolecules, is treated with high energy, modification of the molecular weight of the fluoropolymer results. For example, irradiation of a PTFE dispersion causes chain scission within the PTFE, decreasing the molecular weight. The dispersion may optionally be dried. In this manner, either a dispersion of fluoropolymer particles, or a fluoropolymer powder is produced efficiently and cheaply. The effectiveness of the high energy treatment to induce chain scission within PTFE has been found to increase in the presence of small, mobile, reactive molecular species which have affinity for the fluoropolymers, such as, for example, oxygen. Any mobile reactive molecular source may be used. A suitable oxygen source, such as hydrogen peroxide or ozone, for example, may be added to the liquid fluoropolymer dispersion prior to high energy treatment, in order to increase the effectiveness of the high energy treatment.

In one form thereof, the present invention provides a composition including individual fluoropolymer particles having macromolecules attached thereto by high energy treatment.

In another form thereof, the present invention provides a method for treating a fluoropolymer, including the steps of providing a mixture of fluoropolymer particles and macromolecules; and subjecting the mixture to high energy treatment to thereby attach macromolecules to the fluoropolymer particles.

In a further form thereof, the present invention provides a method of surface treating fluoropolymer particles which includes the steps of providing fluoropolymer particles in a liquid dispersion; and subjecting the dispersion to high energy treatment.

In a further form thereof, the present invention provides a method of providing a wettable surface characteristic to inert polymer powder particles which includes the steps of a) providing an inert polymer powder in a liquid dispersion; b) adding a surface treatment agent to the dispersion and c) subjecting the dispersion from step b) to irradiation to surface treat the inert polymer powder.

In a further form thereof, the present invention provides a method of modifying the molecular weight of fluoropolymer particles which includes the steps of a) providing fluoropolymer particles in a liquid dispersion; and b) subjecting the dispersion to high energy treatment to cause chain scission of the fluoropolymer particles.

In a further form thereof, a method of surface treating fluoropolymer particles is provided, including the steps of a) providing fluoropolymer particles in a liquid dispersion; b) adding to the dispersion a macromolecular species and a crosslinking agent; and c) subjecting the dispersion to heat treatment, whereby the macromolecular species is immobilized on the fluoropolymer particles.

BRIEF DESCRIPTION OF THE DRAWING

The present invention will be described with reference to the attached drawing, which is given as a non-limiting example only, in which:

FIG. 1 is a graph which shows weight loss versus number of passes through atmospheric plasma treatment for 5% PEG on PTFE.

BEST MODE FOR CARRYING OUT THE INVENTION

The present invention is directed to fluoropolymers, which as defined herein includes any fluorine-containing polymer including homopolymers, copolymers and terpolymers, and fluoroelastomers. Examples of fluoropolymers include:

1. Homopolymers, including: polytetrafluoroethylene (PTFE), polytrifluoroethylene, polyvinylidene fluoride (PVDF), polychlorotrifluoroethylene (PCTFE), and polyvinyl fluoride (PVF);
2. Co-polymers, including: tetrafluoroethylene-hexafluoropropylene known as fluorinated ethylene-propylene (FEP), tetrafluoroethylene and perfluorovinylethers known as MFA and PFA, ethylene and tetrafluoroethylene known as ETFE, ethylene and chlorotrifluoroethylene known as ECTFE, vinylidene fluoride and hexafluoropropene known as fluoroelastomers; and
3. Terpolymers, including: tetrafluoroethylene-hexafluoropropylene-vinylidene fluoride known as THV, vinylidene fluoride, hexafluoropropene and tetrafluoroethylene known as terpolymer fluoroelastomers.

Generally, these are polymers made with one or more of the following specific examples of fluoromonomers including: tetrafluoroethylene, hexafluoropropylene, vinylidene fluoride, vinyl fluoride, trifluoroethylene, chlorotrifluoroethylene, and perfluorovinylethers. Other non-fluoropolymers which are inert such as polyether ether ketone (PEEK), polyetherimide (PEI), Polyamide-imide (PAI), Polyphenylene oxide (PPO), Polyphenylene sulphide (PPS), Polysulfone (PS), and Polyethersulfone (PES) can also be treated according to the present invention.

Fluoropolymers are well known as being inert and because of their extremely low surface energy and non-polarity are non-wettable. Their inertness makes fluoropolymers suitable for use in a variety of applications including bearing materials, non-stick cooking surfaces, etc. However, the inability to become wetted and their extreme chemical inertness as a powder limits their application in other fields of use, in which they would seem to be otherwise very desirable. The surface treatment process of the present invention changes the surface chemistry of the fluoropolymer powder particles so the surface of the particles are chemically reactive and interact with polar solvents, while maintaining the overall characteristics of the bulk fluoropolymer properties.

During the course of the present invention, the inventor determined to apply the most effective surface treatment technologies that are currently used to commercially treat fluoropolymer sheets, film, and other shaped articles to fluoropolymer particles. As a result of these efforts, the present inventor unexpectedly discovered that all known surface treatment technologies were not effective when applied to fluoropolymer powders.

According to the present invention, powders are defined as a material having a physical particle size of less than 100 microns, with no length to diameter restrictions or minimum particle diameter.

In attempting to apply atmospheric plasma treatment to fluoropolymer powders using existing techniques and technologies, it was discovered that the high surface area of the powders prohibited effectiveness of the treatment even when atmospheric plasma treatment was carried out in the presence of reactive molecules in the gas phase. This is in contrast to the effectiveness of these techniques and technologies when they are used to treat PTFE sheet surfaces, where individual fluorine atoms are reacted and substituted by other small chemical species to leave reactive groups on the sheet surface. It is believed that the difference results can be attributed to the fact that the unit surface area of a sheet or film of PTFE is very small as compared to a powder which can have a surface area of 1 to 20 $m^2$/gram. The initial results of these tests indicate that existing techniques and technologies are uncompetitive for handling the high surface values of fluoropolymer powders—residence time and power input would be far too great.

Accordingly, the present invention involves chemically treating fluoropolymer powders prior to subjecting them to atmospheric plasma treatment. The results of testing this treatment protocol demonstrate that the new surface treatment is much more effective and permanent than that of surface treatment without prior chemical treatment. Moreover, it was unexpectedly discovered that the prior chemical treatment of the powders allowed subsequent atmospheric plasma treatment of the powders despite their large surface area.

The present invention surface treats fluoropolymer powders by first contacting the powders with macromolecule chemical species which can be dissolved in a solvent, including water. The chemical species is mixed together with the fluoropolymer powder so that an intimate mixture is obtained. The mixing can be accomplished in any suitable stirred vessel such as a PK blender. In addition, a cross-linking agent can be included, as discussed below.

After mixing, the resulting product is subject to a heating process that removes the solvent and leaves a dry macromolecule which is uniformly distributed and closely held on the surface of the fluoropolymer powder particles. The concentration of the macromolecule chemical species is from about 0.1 to about 25 wt. %, with a concentration of from about 0.2 to about 5 wt. % being generally useful for purposes of the present invention. Higher surface area polymer powders will require more of the macromolecule chemical species than lower surface area polymer powders. Concentrations can also vary depending on the molecular weight of the macromolecule chemical species.

Macromolecules having repetitive units are particularly useful for purposes of the present invention. Polyvinyl alcohol ("PVOH"), polylactic acid, polyacrylamides, polyvinylamines, polyallylamines, polyethyleneimines, poly vinyl pyrrilidones ("PVP"), polyvinylpyridines, polyethylene glycol ("PEG"), poly acrylic acid ("PAA"), polyacrylates, polymethacrylates, copolymers thereof, and mixtures thereof are non-limiting examples of such macromolecules that provide significant functionality per molecule. As used herein, the term "macromolecule" refers to any relatively large molecular weight molecule having a number of one or several relatively simple structural units, each structural unit consisting of several atoms bonded together.

It has been found that it is more effective to add a poly acrylic acid than add its monomer in the atmospheric plasma treatment since the density at which the molecule is attached to the surface of polymer powder particles is dependent upon both the concentration of the molecule on the surface of the powder and the density of the ionized, reaction-inducing species in the plasma. Moreover, it is impossible to obtain the concentration of the monomer on the surface of the powder particles equivalent to that obtained using the macromolecules and the pre-blending techniques. It is presumed that the ionized species cause the macromolecule not only to both cross link as in the case of pure cross linking, but also to cause chain scission and also to covalently bond with the fluoropolymer surface. A decrease in the molecular weight of the macromolecule has been observed which is consistent with the fact that the ionized species in the plasma are effective in bringing about chemical reaction and even chain scission of the macromolecule. The macromolecule develops a strong physical interaction with the fluoropolymer powder particle surface, which surprisingly becomes irreversible (they no longer can be dissolved in polar solvents) after the crosslinking. Thus, functionality can be effectively attached to the powder particle surfaces without resorting to massive ion densities and/or long residence times in the plasma.

By titrating both alcohol and acid functions of the surface treated fluoropolymer powder particles the present inventor has concluded that the degree of surface treatment is in agreement with theoretical calculations. It is assumed that these chemical species can react with other species and thus improve the incorporation and result in better blends and physical properties. This assumption has been proven true experimentally by comparing both the uniformity of fluoroelastomer/micropowder as compared to non-surface treated equivalents by increases in the uniformity and hardness of the comparative films produced, the increase in mixing temperatures and the physical properties of the final product.

Subsequent extraction tests have shown that the percentage of the macromolecule chemical species attached to the surface of the fluoropolymer powder particles varies from about 40 to about 100 wt. % and is: inversely proportional to the concentration of the macromolecule, i.e. lower concentrations are more fixed; dependent on the macromolecule and fluoropolymer species; dependent on the residence time in the plasma and the type of gas/gas mixture of the plasma; and proportional to the power density of the plasma. This is also valid for macromolecule cross-linking.

The plasma gases, gas mixtures and macromolecular chemical species all affect the chemistry of the surface treatment. In one example according to the present invention, when oxygen was added to a PTFE powder during treatment with PVOH, the acidity of the sample was raised by a factor of three (caused by oxidation of the alcohol to an acid) as compared to a similar non-oxygenated treatment process.

Tests were conducted in which non-pretreated fluoropolymer powders were subject to atmospheric plasma treatment during which ammonia and low molecular weight reactive gases were added. The results of these tests showed that there was a poor concentration of the reacted species from the reactive gas addition on the surfaces of the polymer powder particles. These tests indicate that addition of small molecular chemical species during the atmospheric plasma treatment was ineffective for surface treating the fluoropolymer powders.

It was concluded that the addition of the macromolecular chemical species does not necessarily have to be done using pre-solvent mixing followed by solvent removal by heat. Alternatively, concurrent addition of a solvent solution incorporating the macromolecule chemical species just prior to, or contemporaneously with, the atmospheric plasma treatment is foreseeable according to the present invention. According to a further embodiment, the macromolecules could be provided in a liquid form without a solvent and applied directly to the fluoropolymer powders.

In order to test the wettability of surface treated fluoropolymer powders produced according to the present invention, samples were made by pretreating PTFE with PVOH and subjecting the resulting pretreated polymer powder to atmospheric plasma treating. Up to 50 wt. % of the surface treated PTFE was mixed with water and agitated in a pressure mill to produce a consistent paste that was found to be storage stable or could be easily resuspended by simple mixing. In other formulations, 40 wt. % of the surface treated PTFE powder was mixed with water to form a paste. It was found that these pastes can be easily incorporated into other systems without the use of surfactants or other wetting agents.

In comparative tests, it was found that untreated PTFE powder was so hydrophobic that it could not be mixed with water without the addition of surfactants, typically concentrations of from about 1 to about 7 wt. % are needed.

Using the techniques of the present invention, pastes were made from surface treated powders of PTFE (micropowders), virgin PTFE, FEP and PVDF. These pastes were sprayed onto aluminum panels (with or without dilution), and the residual water was flashed off at 200° F. The coatings on the panels were then cured at temperatures above the melting point of the fluoropolymer powders.

When curing was finished, the surface treated polymer pastes demonstrated excellent adhesion in all cases to the aluminum panels (untreated PTFE powders are not water suspendable without a surfactant aid and even with a surfactant may not form cohesive films). Mud crack-free films of various thicknesses from 0.03 to about 1 mils were produced. All the films were uniform and had good gloss characteristics. Both the surface treated FEP, ECTFE and PVDF films demonstrated very good physical properties.

Surface treated PVDF gave a much better MEK rub resistance as compared to untreated PVDF powder suspended with the use of a surfactant, and did not crack when subject to boiling water over a 0 bend. The MEK rub resistance referred to is a standard solvent resistance test which involves rubbing a surface coated with a cloth soaked in methyl ethyl ketone, and measuring the number of double finger rubs (a double rub is one forward and one reverse rub) to rub through the film.

When surface treated PTFE micropowder was added to Ausimont's fluoroelastomer TN latex it showed excellent incorporation as compared to non-treated PTFE and when sprayed and cured at 805° F. produced a tough, strong film. Similar surface treated fluoropolymer powder coating applied to glass panel demonstrated excellent adhesion.

The aqueous pastes produced by mixing the surface treated fluoropolymer powders in water demonstrate novel properties.

In a surfactant suspended fluoropolymer powder system, the surfactant is not "locked" to the polymer powder particles. Rather, it equilibrates between the aqueous phase, the particles and other hydrophobic surfaces. This usually results in detrimental performance. For example, in surface coating applications, achievable adhesion will be reduced caused by the surfactant equilibrating between the water, polymer and surface to be coated, resulting in a barrier to adhesion.

Also in surfactant suspended fluoropolymer powder systems, the surfactant "holds" water up to relatively high temperatures and thus can increase mud cracking as the coating system dries.

In polymerized aqueous dispersions of PTFE there is normally present a fluorosurfactant (APFO), which when used in conjunction with a normal surfactant such as Triton X-100 forms a stable dispersion. In the surface treated fluoropolymer powder aqueous paste compositions of the present invention made from granular PTFE, hydrocarbon and APFO surfactants are completely absent. This is significant when considering that APFO is a known bio-accumulator and its role in coating systems is usually detrimental.

In contrast to typical surfactants, the surface treated fluoropolymer powders of the present invention have completely hydrophilic molecules attached thereto capable of maintaining a stable powder particle dispersion. And yet the hydrophilic molecules behave in a similar manner to surfactants, but they are immobilized (cannot migrate) and they are surprisingly effective in providing stable dispersion at a concentration that, percent wise to the fluoropolymer, is much lower in respect to latexes of the art.

The molecules used in the surface treated fluoropolymer powder aqueous paste compositions of the present invention are "environmentally friendly."

Different surface treated fluoropolymer powder aqueous paste compositions produced according to the present invention can be mixed to obtain improved and unexpected results. For example, adding an FEP surface treated powder to a low molecular weight PTFE micropowder enhances the physical strength of the resulting film.

This invention provides, through a novel combination of process steps already available in the art, a new product represented by powders of various fluoropolymers surface treated along the present invention, which falls in-between the fluoropolymer powders and fluoropolymer latexes of the art and, because of advantages in respect to each, is capable of polarizing the existing application technologies towards this new third way of making fluoropolymers more compatible with effective and environmental friendly mean of application.

According to an alternative embodiment of the present invention, immobilization of the macromolecular chemical species can be accomplished by the use of a cross-linking agent, such as, for example, an organic peroxide, that can be combined with the macromolecular chemical species prior to (or during) the coating of the fluoropolymer powder particles. Thereafter, the coated fluoropolymer powder particles can be heated to effect cross-linking of the macromolecules (by decomposition of the cross-linking agent into reactive species) without subsequent atmospheric plasma treatment (which can still be optionally used).

The following non-limiting Examples illustrate various features and characteristics of the present invention which are not to be construed as limited thereto. Throughout the Examples and elsewhere herein percentages are by weight unless otherwise indicated.

EXAMPLE 1

Surface Treatment of Powders

In this Example, fluoropolymer powder particles were surface treated with a number of macromolecular chemical species.

Table 1 lists the fluoropolymer powders, their average particle size and molecular weight. Table 2 lists the macromolecular chemical species, their molecular weights, minimum and maximum concentrations, cross linking-agents and concentrations of the cross-linking agents.

TABLE 1

| Base Powder | Average Particle Size. $D_{50}$ Microns | Molecular Weight/Melt Index |
|---|---|---|
| PTFE | 35 | $>1 \times 10^6$ |
| Irradiated PTFE | 3 to 15 | $1 \times 10^3$-$1 \times 10^6$ |
| PVDF | 5 | Melt Viscosity 30 Kp @ 232° C. |
| FEP | 5 to 25 | Melt Index 2 to 20 @ 375° C. |
| ECTFE | 25 | Melt Index 12 |

To surface coat the fluoropolymer powder particles, a measured amount of the fluoropolymer powder (typically 2 Kg) was charged into a commercial solid/liquid blender. The blender was then started and a desired amount of the macromolecular chemical species (typically 10 gm) and a desired amount of cross-linking agent (typically 0.25 gm) was added to the blender and the blending blades were started. The mixture was blended for about 15 minutes. After mixing, the material was placed on a tray and dried in a 104° C. oven for about 2 hours. Evaporation of was determined by measuring weight loss. After drying, the dried material was heated in a 150° C. oven to activate the cross-linking agent.

The surface coated fluoropolymer powders were subject to atmospheric plasma treatment by passing the powders through a plasma along a vibrating trough. A treatment apparatus was set up which included a vibrating trough, plasma electrodes, a readily ionizable gas supply, an optional reactive gas supply, and cooling systems for the electrodes and the vibrating trough (to transport the fluoropolymer powders through the plasma). An air flow was initiated to cool the electrodes and water was used to cool the vibrating trough. A flow of ionizable gas (e.g. 2990 ml/min Helium) was provided together with an optional reactive gas, when used (e.g. 300 ml/min oxygen). The electrical power to the electrodes was adjusted to about 1.5 kilowatts to create a plasma. The vibrating trough was adjusted to transport about 0.25 kg/min of the fluoropolymer through the plasma. The fluoropolymer powder can be repeatedly passed though the plasma a number of times to obtain desired properties. A similar APT process is used for fluoropolymer powders that are either pretreated (coated) or not pretreated with a macromolecular chemical species.

EXAMPLE 2

Hydroxyl and Acid Numbers

Titrating both alcohol and acid functions of the surface treated fluoropolymer powder particles can be used to determine the degree of surface treatment.

In this Example the method of ASTM D 1957-86 was followed. This method utilizes acetylation reaction, which converts the primary alcohol to an ester through reaction with acetic anhydride, liberating one mole of acetic acid. Upon hydrolysis, the same will require less potassium hydroxide to reach the phenolphthalein end point (neutralization) relative to a control, which upon hydrolysis yields 2 moles of acetic acid.

In this Example, 10.0 g of each individual surface treated powder was placed in a 250 ml Erlenmeyer flask and the total

TABLE 2

| Macromolecular | Commercial Name | Typical Molecular weight | Min Conc. gm/gm of powder | Max Conc. gm/gm of powder | Cross-linking agent | Typical conc. cross-linking agent gm/gm of macromolecule |
|---|---|---|---|---|---|---|
| PEG | Carbowax 900 | 300, 900 and 1450 | 0.003 | 0.1 | Polycup 172 | 0.1 |
| PVOH | Celvol 502 | 15,000 | 0.001 | 0.05 | Polycup 172 | 0.1 |
| PAA | Sokalen PA 80S | 90,000 | 0.003 | 0.05 | Diak #3 | 0.05 |
| Epoxy Functional Silane | Coatasil 1770 | 288 | 0.02 | 0.02 | Hydrolysis | 0 |
| Non Ionic Silane | Silquest 1230 | >300 | 0.02 | 0.02 | Hydrolysis | 0 |
| PVP | Plasdone C-15 | Unknown | 0.02 | 0.02 | None | 0 |

Polycup 172 = polyamide-epichlorohydrin
Diak #3 = diamine weight of the sample and flask were recorded. 5 ml of 3:1 volume mixture of pyridine: acetic anhydride was added to the flask.

9.0-11.0 g of the same sample was placed in a second flask for acid value titration and the total weight of the sample and flask was recorded. 10 ml pyridine was added to the second flask.

Both flasks were provided with refluxing condensers and the contents were stirred and heated to 100° F. for one hour. After heating 10 ml of water was added to each flask and the contents were allowed to cool for 10 minutes.

After cooling, 25 ml butyl alcohol was added to each flask through the refluxing condensers. Then 1 ml phenolphthalein was added to each flask and neutralized with 0.5 N potassium hydroxide in ethanol solution.

The hydroxyl value was calculated by the equation:

Hydroxyl value=$B+(SA/C)-V/S \times N(56.1)$ where A=KOH solution required for titration of the acid value in ml; B=KOH solution required for titration of the reagent blank in ml; C=sample used for the acid value in grams; V=KOH solution required for titration of the acetylated specimen in ml; and S=sample for acetylation in grams; and N=normality (0.5).

Typical hydroxyl and acid numbers for several samples of surface treated fluoropolymer powders are give in Table 3.

TABLE 3

| Polymer | Macro-molecule | Concentration on the Polymer (wt. %) | Number passes through APT | Acidity (mgs) KOH/gm | Hydroxyl Value |
|---|---|---|---|---|---|
| Higher molecular wt. micropowder | None | 0 | 0 | 0.3 | — |
| PTFE micropowder | None | 0 | 0 | 0.9 | — |
| PTFE micropowder | PEG 900 | 5.0 | 2 | 1.2 | — |
| PTFE micropowder | PEG 900 | 5.0 | 4 | 1.4 | — |
| PTFE micropowder | PEG 900 | 5.0 | 6 | 1.7 | 2.9 |
| PTFE micropowder | PAA | 2.0 | 6 | 13.2 | — |
| PTFE micropowder | PVOH | 2.0 | 0 | 0.3 | 21.0 |
| PTFE micropowder | PVOH | 2.0 | 2 | 0.8 | 16.4 |
| PTFE micropowder | PVOH | 2.0 | 6 | 0.6 | 16.7 |

The results of this Example were used to verify that the degree of surface treatment achieved in practice is in general agreement with theoretical calculations.

EXAMPLE 3

Weight Loss and Extraction Results

In this Example extraction tests were performed to determine the amount of surface treated material which is neither covalently attached nor permanently adsorbed one the fluoropolymer powder.

About 5 g of each sample was placed on an analytical balanced and the weight was recorded. 60 ml of an appropriate solvent (isopropanol for polyethylene glycol, deionized water for polyvinyl alcohol, etc.) was mixed with the sample. The mixture was mixed for 2 hours over low heat (about 100° F.). After heating, the sample mixture was poured into a 150 ml Durapore™ 0.22 µm filtration device. The material that was removed as the solvent passes through the filter and was collected. The total weight of the solvent (containing the extracted material) was recorded. About 1 g of the solvent was placed into an aluminum weighting dish and the total weight of the solvent and dish are weighed. The solvent was evaporated in a vented oven that was heated to 100° C. The percentage of material extracted was calculated by the equation:

$E=100 \times [(F-P)/S] \times T/W$ where E=percentage of surface treatment extracted; F=final weight of pan and extracted material after evaporation; P=tare pan weight; S=sample weight of solvent for percent solids test; T=total weight of solvent; W=weight of fluoropolymer sample.

The procedure of this Example was used to produce the graph of FIG. 1 which shows weight loss versus number of passes through atmospheric plasma treatment for 5% PEG on PTFE. The graph includes a comparison between actual measured values versus predicted weight loss. In FIG. 1, weight loss was measured at 200° C. for 2 hours. Extraction was achieved by washing the polymer with excess water.

FIG. 1 shows that the amount of PEG attached to the polymer (and not removed by evaporation or extraction) increases as treated PTEF is repetitively passed through the APT. Since the hydroxyl values do not follow the empirical predicted weight loss in FIG. 1 which show a downward trend with APT it can be concluded that the PEG was not being evaporated.

EXAMPLE 4

Spray Test Results

In this Example surface treated fluoropolymer powders were formed into pastes that were sprayed onto aluminum panels to test coating properties.

Pastes having 40 wt. % solids were prepared by placing a desired amount of deionized water into a mixing bowl and creating a vortex. Next, enough fluoropolymer powder was introduced directly into the vortex to produce a mixture having 40 wt. % solids. The mixing was continued until the mixture was homogeneous and then the mixture was passed through a horizontal mill.

The powder pastes were sprayed onto aluminum Q-panels using an air assisted Binks Model 69 spray gun with a #66S fluid nozzle and #66SD air cap. Additional water can be used if necessary for ease of spraying as determined by the operator. After spray coating the panel were then flashed to remove water in a well-ventilated oven for 2 minutes at 100° C. The coated panels were then cured for approximately 10 minutes at a temperature of about 30° C. above the melting point of the fluoropolymer.

The thickness of the films was in the range of 0.1-1.0 mil (dry film thickness). The films were rated according to critical cracking thickness, film integrity, flexibility and overall appearance, including gloss, color, etc.

Data and analysis of several coatings are presented in Table 4.

TABLE 4

| Polymer | Macro-molecule | Cure Temp | Thickness | Film Quality |
|---|---|---|---|---|
| PTFE micropowder | None | | N/A | Cannot disperse PTFE in water without surfactant. |
| PTFE micropowder | None 1% Triton X | 805 | 0.25 | Some mud cracking. Good film, average adhesion, poor physicals. |
| PTFE micropowder | 0.5% PVOH | 805 | 0.85 | No mud cracking. Good film. Good adhesion, poor physicals. |
| PTFE micropowder | 2% PAA | 805 | 0.3 | No mud cracking. Good gloss, Clear. Good adhesion, poor physicals. |
| PTFE micropowder | 2% PAA + PEG | 805 | 0.15 | No mud cracking. Good gloss. Good adhesion, poor physicals. |
| PTFE micropowder | 5% PEG | 805 | 0.5 | No mud cracking. Good gloss. Some browning. Good adhesion, poor physicals. |

TABLE 4-continued

| Polymer | Macro-molecule | Cure Temp | Thickness | Film Quality |
|---|---|---|---|---|
| FEP | 0.5% PVOH | 750 | 0.1 | Very good adhesion. Very good gloss. Tough coating. |
| PVDF | None 1% Triton X | 550 | 0.1 | Poor adhesion. Very good gloss. Tough coating. Poor resistance to MEK rub and poor bend test performance. |
| PVDF | 0.5% PVOH | 550 | 0.1 | Very clear. Very good adhesion. Decent gloss. Tough coating |

The results shown in Table 4 indicate that the surface treated fluoropolymer polymer powders produced according to the present invention can be used to produce fluoropolymer surface coatings according to relatively simple and efficient spray processes.

The surface treated fluoropolymers powders of the present invention can be used to produce various articles, compositions and additives. Several exemplary examples include fillers, extrusion aids, additives in oils, greases and other lubricants, and additives in and inks, paints and coating compositions.

In addition to atmospheric plasma treatment, during the course of the present invention, it was also determined that other high energy processes such as x-ray radiation, electron radiation, and ultraviolet radiation, could be used to immobilize the macromolecules on the surfaces of the fluoropolymer powders.

The process of surface treating fluoropolymer particles by subjecting them to atmospheric plasma treatment, as discussed above and as embodied in Examples 1-4 herein, becomes increasingly difficult as the particle size of the powders is reduced.

In order to process micropowders, including particles having particle sizes of 2 microns or less, the present inventors have developed a process in which the fluoropolymer particles are dispersed in a liquid medium and subjected to high energy treatment while in the liquid medium, such high energy treatment including atmospheric plasma, x-ray radiation, electron radiation, ultraviolet radiation, etc., collectively referred to herein as "ionizing radiation."

Specifically, it has been found that fluoropolymers may be treated in a "wet system." In one aspect, fluoropolymer particles are dispersed in a liquid medium together with a macromolecule, and thereafter subjected to high energy treatment, such as ionizing radiation and in particular, electron beam irradiation, in order to surface treat the fluoropolymer powders by immobilizing the macromolecules thereon. In addition, for PTFE, the irradiation treatment simultaneously induces chain scission within the fluoropolymer, thereby reducing the molecular weight of the fluoropolymer to form a surface treated fluoropolymer dispersion, which can be very desirable for many additive applications. This surface treated fluoropolymer dispersion may optionally be dried to form a surface treated fluoropolymer micropowder.

Notably also, when a liquid dispersion of PTFE, not including macromolecules therein, is subjected to high energy treatment, chain scission is induced within the fluoropolymer, thereby reducing the molecular weight of the fluoropolymer to form a fluoropolymer dispersion, which may be dried to form a fluoropolymer micropowder. Surfactants may optionally be added to the dispersion prior to or post high energy treatment.

According to one embodiment, the fluoropolymer powders are dispersed in a polar liquid medium such as water, together with either the macromolecule chemical species or surface treating agents discussed above, or surfactants, to form a particle dispersion. The resulting particle dispersions are then subject to high energy treatment, such as ionizing radiation treatment, by either placing the dispersions in the radiation or by passing, e.g. pumping, the dispersions through the radiation. According to one embodiment, the dispersions are pumped through a thin-walled low radiation absorption conduit that is positioned within the radiation. The conduit can have any convenient configuration that will provide a sufficient residence time within the radiation to produce a desired level of treatment, including configurations that will provide several passes of a segment of the dispersions through the radiation.

During the course of the present invention, it was surprisingly discovered that when fluoropolymer powders were dispersed in water with surfactants or dispersions made from direct polymerization with or without added surfactants, and subjected to low levels (5 Mrads or less) of ionizing radiation treatment and dried, the process resulted in free-flowing powders unlike those materials that had not undergone radiation which results in highly agglomerated material upon drying. This result indicates that the surface of the fluoropolymer particles underwent a chemical and/or physical change.

The process of using a "wet system" to treat fluoropolymer powders according to the present invention allows treatment of particle sizes over a large size range, including those that are appreciably smaller than those of powders that can be efficiently treated dry, e.g. using a vibrating trough or other powder transport means. Although the "wet system" discussed herein may be used to treat particles having a size ranging from 100 microns or less, powders having particle sizes as small as 0.05 microns or less can advantageously be surface treated using the "wet systems" discussed herein. In addition, granular fluoropolymer materials having sizes up to 500 microns can also be surface treated in the "wet systems" of the present invention.

Another advantage associated with surface treating fluoropolymer particles in "wet systems" according to the present invention is that the liquid medium absorbs the heat of irradiation during ionizing radiation treatment and thereby protects the powder particles and surface treatment agents from being subject to heat effects. The ability of the liquid medium to absorb the heat of irradiation during treatment will allow between 2 to 10 times the irradiation dose per pass to be used during radiation treatment verses the equivalent dry process, thus increasing the productivity of the treatment process. A typical electron beam radiation dosage is from about 0.1 to about 300 Mrads, and more preferably from about 2 to about 90 Mrads.

The following non-limiting Example illustrates various features and characteristics of the present invention which are associated with the use of wet processing systems.

EXAMPLE 5

Aqueous Irradiation of Fluoropolymer Particles

In this Example, wet systems of fluoropolymer powders with and without surface treatment agents, such as macromolecules, were prepared and subjected to electron beam irradiation. The wet system may be, for example, produced via suspension of fluoropolymer particles, a purchased suspension of fluoropolymer particles, or a purchased dispersion from the direct polymerization of fluoro-monomers.

2 to 4 wt. % PAA and PVOH were added directly to polymerized unstabilized aqueous PTFE and PVDF latexes (wt. % solids varying from 15 to 40 wt % in water) and it was found that the resulting mixtures did not coagulate. The lattices of the mixtures appeared to be stable, settling very slowly and only producing a clear layer for the top 20% of the liquid after a significant time period. Re-suspension was very easy to achieve. These results indicate that the mixtures were sufficiently stable for irradiation processing. It was further determined that less than 2 wt. % of the surface treatment agents could be used. In practice, the surface treating agents mentioned herein can be used in amounts of from about 0.1 wt. % to about 10 wt. %.

The mixtures prepared above were irradiated by exposing the mixtures to electron beam irradiation at a dosage of between 5 and 100 Mrads. In addition, a commercial dispersion containing 60% solids PTFE in water and Triton-X 100 (a surfactant) was irradiated by exposing the mixture to electron beam irradiation at a dosage of 10 to 100 Mrads.

dispersions showed an increase in the effectiveness of the electron irradiation. These results indicate that the oxygen inside the polymer particle is one of the major determining factors in irradiation efficiency.

EXAMPLE 6

Aqueous Irradiation of Fluoropolymer Particles—Modification of Molecular Weight and Irradiation Efficiency In order to demonstrate modification in molecular weight of PTFE by irradiation of PTFE particles in a wet system according to the present invention, as well as the effect of the presence of oxygen in the wet system on irradiation efficiency, portions of PTFE in both granular and aqueous dispersion form were mixed with water to form wet systems, and the resulting mixtures were irradiated, the results of which are set forth in Table 5 below. Also, surfactants, macromolecules, and hydrogen peroxide were added to the mixtures as indicated prior to irradiation. The mixtures were electron beam irradiated at radiation doses of between 10 and 100 megarads (Mrads).

TABLE 5

| # | PTFE Type | Average particle size in microns | % solids in water | Surfactant | Macromolecule | Hydrogen Peroxide Added in ppm by weight on polymer | E- Beam Total Radiation level delivered to mixture in Mrads | Actual Melt point (° C. DSC @ 10° C./min) | Delta Melt Point in ° C. from expected value (Negative numbers indicate high efficiency) |
|---|---|---|---|---|---|---|---|---|---|
| 1 | Granular | 110 | 30% | None | 1.5% PAA | None | 40 | 333.6 | −2.4 |
| 2 | Granular | 110 | 40% | 0.5% BYK 333 | None | None | 40 | 329.0 | −3.0 |
| 3 | Granular | 110 | 30% | 0.4% Surfynol D 604 and 0.1% Surfynol D 110 | None | 300 | 100 | 322.8 | −6.2 |
| 4 | Granular | 10 | 40% | None | 1% PAA | None | 41 | 325.1 | −2.4 |
| 5 | Aqueous Dispersion | 0.18 | 60% | 6.8% Triton X-100 | None | None | 40 | 334.0 | +4.0 |
| 6 | Aqueous Dispersion | 0.25 | 39% | None | 2% PAA | None | 10 | 337.4 | 0.0 |
| 7 | Aqueous Dispersion | 0.25 | 32% | 0.4% Surfynol D 604 and 0.1% Surfynol D 110 | None | 300 | 60 | 328.3 | −3.0 |

For PTFE, electron beam irradiation of dry powders is the accepted way to achieve chain scission and reduce the molecular weight of the polymer. However, the irradiation efficiency of PTFE in the liquid dispersions or "wet" systems of the present invention was found to be much higher than one would expect based upon the weight percentages of the fluoropolymer and water. When a 40 wt. % solids dispersion of milled PTFE was treated with 1.5 wt. % PAA in water and irradiated via electron beam irradiation at 40 Mrads, it was found that the irradiation efficiency was nearly equivalent to that of irradiation of dry powder. However, the directly polymerized dispersions had lower efficiencies. This difference is believed to be due to low oxygen levels inside the dispersion particles of the 0.2 micron directly polymerized PTFE dispersions, while the milled granular PTFE particles have a much higher oxygen content. It has been found that oxygen content dramatically affects the efficiency of the irradiation. For example, experiments in which 300 ppm of hydrogen peroxide (by weight of the polymer) was added to the liquid After the mixtures were irradiated and dried, the melting point of the PTFE was determined by differential scanning calorimetry (DSC). Generally, a lower melting point of the PTFE from an expected value indicates a reduction in molecular weight of the PTFE, and a increase in the melting point of the PTFE from an expected value indicates an increase in the molecular weight of the PTFE. In runs 1, 2, and 4, wet systems of granular PTFE were reduced in molecular weight by irradiation, wherein the reduction in weight is thought to be facilitated by the presence of a small amount of oxygen from the air entrapped in the open granular PTFE structure prior to mixing the granular PTFE in water. In run 3, granular PTFE, together with added hydrogen peroxide, exhibited a greater reduction in molecular weight than that observed for the granular PTFE of runs 1, 2, and 4. The molecular weight of the PTFE in run 5 was not reduced, but rather was increased, which is thought to be attributable to the lack of available oxygen in the wet system of run 5 since in this case the PTFE is directly polymerized in the aqueous media in the absence of oxygen and then each particle surrounded by a significant weight of hydrocarbon surfactant which further acts as a barrier to oxygen absorption. Run 6, again directly polymerized PTFE in aqueous dispersion form with no added surfactant, but with a macromolecule added, exhibited no melting value change, indicating typical modification of the molecular weight, presumably, in this case, using the carboxylic end groups as an effective source of reactive species. In run 7, directly polymerized PTFE in aqueous dispersion form, with both a small amount of surfactant and hydrogen peroxide added, exhibited a reduction in molecular weight.

EXAMPLE 7

Fluoropolymer Treatment with Crosslinking Agent and Application of Treated Fluoropolymer to a Substrate The following example illustrates immobilization of macromolecules onto fluoropolymer particles by crosslinking the macromolecules to form surface treated fluoropolymers having improved functional characteristics. Polyacrylic acid (PAA) at 0.5 wt. % was added to each of polyvinylidene fluoride (PVDF) and ethylene tetrafluoroethylene (ETFE) powders, and the foregoing mixtures were dispersed in water at 40 wt. % solids content to form slurries. Then, 0.5 wt. % (based on PAA) Jeffermine D230 (polyoxypropylenediamine), a commercially available crosslinking agent, was added to each of the foregoing mixtures. Each of the foregoing mixtures were then heated to 90° C. for one hour to induce crosslinking therewithin. The mixtures were then dried to form wettable PVDF and ETFE powders, the powder particles having crosslinked PAA immobilized thereon.

The heat treated PVDF powder was mixed with water, and the resulting mixture was sprayed onto an aluminum "Q" panel, followed by heat treatment of the panel to cure the fluoropolymer, resulting in a PVDF film. As a control, a mixture of untreated PVDF powder dispersed in water with added Triton X-100, a surfactant, was also sprayed onto an aluminum "Q" panel and cured to form a film. The panels were each bent 180° and then exposed to boiling water. The film of treated PVDF exhibited good adhesion to the panel, even in the bend area, with no cracking, discoloration, or delamination. By contrast, the film of untreated PVDF exhibited a high level of cracking and substantial delamination from the panel, the delamination occurring to a great extent in the area of the 180° bend in the panel.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A method of modifying the molecular weight of fluoropolymer particles, which comprises the steps of:
    a) providing fluoropolymer particles in a liquid dispersion; and
    b) subjecting the liquid dispersion to high energy treatment to cause chain scission of the fluoropolymer particles.

2. The method of modifying the molecular weight of fluoropolymer particles according to claim 1, wherein the liquid dispersion is an aqueous dispersion.

3. The method of modifying the molecular weight of fluoropolymer particles according to claim 2, further comprising, before step b), the additional step of adding a small, mobile, reactive molecular species to the aqueous dispersion.

4. The method of modifying the molecular weight of fluoropolymer particles according to claim 3, wherein the small, mobile, reactive molecular species comprises an oxygen source.

5. The method of modifying the molecular weight of fluoropolymer particles according to claim 4, wherein the oxygen source comprises hydrogen peroxide.

6. The method of modifying the molecular weight of fluoropolymer particles according to claim 2, further comprising the additional step of c) drying the dispersion to provide a fluoropolymer micropowder.

7. The method of modifying the molecular weight of fluoropolymer particles according to claim 2, wherein said step b) causes a reduction in the molecular weight of the fluoropolymer particles.

8. The method of modifying the molecular weight of fluoropolymer particles according to claim 2, wherein step b) comprises subjecting the aqueous dispersion to at least one of atmospheric plasma treatment, x-ray radiation, electron radiation, and ultraviolet radiation.

9. The method of modifying the molecular weight of fluoropolymer particles according to claim 2, wherein said fluoropolymer particles comprise at least one of
    the following polymers: polytetrafluoroethylene, polychlorotrifluoroethylene, polyvinylidene fluoride, polyvinyl fluoride; or
    the following copolymers: tetrafluoroethylene-hexafluoropropylene, tetrafluoroethylene-perfluoromethylvinylether, tetrafluoroethylene-ethylene, hexafluoroethylene-vinylidene fluoride, tetrafluoroethylene-ethylene, ethylene-chlorotrifluoroethylene; or
    terpolymers of: tetrafluoroethylene-hexafluoropropylene-vinylidene fluoride, or mixtures thereof.

10. The method of modifying the molecular weight of fluoropolymer particles according to claim 2, wherein the fluoropolymer particles are produced by polymerization of at least one of the following fluoromonomers: tetrafluoroethylene, vinylidene fluoride, hexafluoropropylene, vinyl fluoride, trifluoroethylene and chlorotrifluoroethylene.

11. The method of modifying the molecular weight of fluoropolymer particles according to claim 2, further comprising, before step a), the additional step of forming the aqueous dispersion by adding water to granular fluoropolymer particles.

12. A method of reducing the molecular weight of fluoropolymer particles, which comprises the steps of:
    a) providing fluoropolymer particles in an aqueous dispersion; and
    b) subjecting the aqueous dispersion to high energy treatment to cause chain scission of the fluoropolymer particles.

13. The method of reducing the molecular weight of fluoropolymer particles according to claim 12, further comprising, before step b), the additional step of adding a small, mobile, reactive molecular species to the aqueous dispersion.

14. The method of reducing the molecular weight of fluoropolymer particles according to claim 13, wherein the small, mobile, reactive molecular species comprises an oxygen source.

15. The method of reducing the molecular weight of fluoropolymer particles according to claim 14, wherein the oxygen source comprises hydrogen peroxide.

16. The method of reducing the molecular weight of fluoropolymer particles according to claim 12, further comprising the additional step of c) drying the aqueous dispersion to provide a fluoropolymer micropowder.

17. The method of reducing the molecular weight of fluoropolymer particles according to claim 12, wherein step b) comprises subjecting the dispersion to at least one of atmospheric plasma treatment, x-ray radiation, electron radiation, and ultraviolet radiation.

18. The method of reducing the molecular weight of fluoropolymer particles according to claim 12, wherein said fluoropolymer particles comprise at least one of the following polymers: polytetrafluoroethylene, polychlorotrifluoroethylene, polyvinylidene fluoride, polyvinyl fluoride; or the following copolymers: tetrafluoroethylene-hexafluoropropylene, tetrafluoroethylene-perfluoromethylvinylether, tetrafluoroethylene-ethylene, hexafluoroethylene-vinylidene fluoride, tetrafluoroethylene-ethylene, ethylene-chlorotrifluoroethylene; or terpolymers of: tetrafluoroethylene-hexafluoropropylene-vinylidene fluoride, or mixtures thereof.

19. The method of reducing the molecular weight of fluoropolymer particles according to claim 12, wherein the fluoropolymer particles are produced by polymerization of at least one of the following fluoromonomers: tetrafluoroethylene, vinylidene fluoride, hexafluoropropylene, vinyl fluoride, trifluoroethylene and chlorotrifluoroethylene.

20. The method of reducing the molecular weight of fluoropolymer particles according to claim 12, further comprising, before step a), the additional step of forming the aqueous dispersion by adding water to granular fluoropolymer particles.

* * * * *